May 20, 1969  L. R. MURPHY  3,444,942
TRANSPORTABLE SCALE WITH EXTENSIBLE DECK
Filed May 28, 1968  Sheet 1 of 6

INVENTOR
LESLIE R. MURPHY
BY
ATTORNEYS

May 20, 1969 L. R. MURPHY 3,444,942
TRANSPORTABLE SCALE WITH EXTENSIBLE DECK
Filed May 28, 1968 Sheet 6 of 6

INVENTOR
LESLIE R. MURPHY
BY
ATTORNEYS

United States Patent Office 3,444,942
Patented May 20, 1969

3,444,942
TRANSPORTABLE SCALE WITH EXTENSIBLE
DECK
Leslie Roy Murphy, Sacramento, Calif., assignor to L. R.
Murphy Scale Company, Sacramento, Calif., a corporation of California
Continuation-in-part of abandoned application Ser. No.
611,014, Jan. 23, 1967. This application May 28, 1968,
Ser. No. 738,370
Int. Cl. G01g 21/28
U.S. Cl. 177—126                     15 Claims

ABSTRACT OF THE DISCLOSURE

A transportable scale. Outrigger brackets project laterally out from the side of the weighbridge between and spaced from upper and lower flanges. An outrigger, more than twice as long as the brackets, is pivotally supported by each outrigger bracket and the upper flange. The outriggers can be swung out individually in line with cross members that join the side members of the weighbridge frame to extend the effective width of the weighbridge frame or can be swung in individually so as to extend out no further than the outrigger brackets. An outrigger support member extends up angularly at about 45° from the lower flange to the lower surface of the outrigger at a locus well beyond the outrigger bracket, the support member being secured to the outrigger and pivotally mounted on the lower flange. Accuracy in weighing is preserved by matching 45° angle braces for each cross member, generally in line with each 45° support for the outriggers.

---

This application is a continuation-in-part of application Ser. No. 611,014, filed Jan. 23, 1967, now abandoned, which was a continuation-in-part of application Ser. No. 517,696, filed Dec. 30, 1965, now abandoned.

This invention relates to improvements in transportable scales with extensible deck.

The size of off-the-highway vehicles has continued to increase, while the necessity for weighing the load has also continued. The need for constructing roads rapidly has required extremely large earth movers and similar vehicles, and these, in turn, have necessarily called for increases in the lengths and widths of the scales which are to weigh them and their loads. Meanwhile, the permissible highway width has tended to remain the same or to increase only slightly. There is greater need than ever for being able to transport these large heavy-duty scales from one place to another as highway construction proceeds and also from one job to another, without having to completely disassemble the scale and without having to unweld and later reweld the major scale parts. It is desirable to keep disassembly and reassembly at a minimum.

Attention to this problem has been given before, as is shown, for example, in the United States Patents 2,869,855, 3,043,386 and 3,097,713. Yet the increase in the size of scale called for has made it difficult for even the scales therein disclosed to keep up with and adequately meet the increases in width of scale platforms necessary when in use off the road, while still complying with permissible highway widths. Widths of eight feet are allowed to be moved over the highway without permits. However, widths over eight feet are permit loads, and it is very difficult to get permits on loads over ten feet wide.

Figure 12:
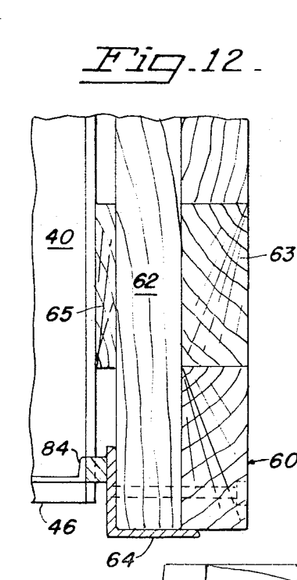
FIG. 12 is a view in section taken along the line 12—12 in FIG. 11.

Heretofore, consideration has been given primarily and almost solely to extending the width of the weighbridge and providing support for the extended portions. What had been overlooked was that the stresses on and possible deformation of the bottom flanges of the main girders in the main weighbridge could seriously affect the weighing accuracy of the scale itself. Actual deformation was eventually given some consideration and some bracing used, as in FIGS. 12 and 13 of my earlier patent No. 3,097,713, but these braces were insufficient to preserve the accuracy of the scale as to weights when extensions were very wide. Since that time, the stress lines in all the known adaptations in swinging outriggers have been analyzed, and it was noted that in each case the accumulations of stresses and deforming of the girders were actually affecting the accuracy of the scales involved.

The effect may be better understood by noting that such scales are designed for accurate weighing of any force that is applied *vertically* on the load-receiving platform. Each degree off vertical in the application of the load results in a corresponding drop in response and therefore in accuracy, until, if a load should be applied horizontally, no force at all would be indicated by the weighing device. Thus, any stress applied as a bending moment detracts from the weighing accuracy.

The present invention addresses itself to that problem and is, so far as the inventor is aware, the first time that a weighbridge with swinging outriggers to support a deck has been so constructed that all of the stresses incurred by a load on the outer edge of the extended outriggers are contained in the weighbridge structure itself. Therefore, there is no deformation at the point of contact between the weighbridge and the lever system, and, consequently, there is no loss of accuracy, as there was in all prior art known by me.

This important result has been obtained by placing the support for the outriggers at 45° angle extending up from the bottom flange of the main weighbridge girder and by backing that support up with a 45° angle brace opposite each outrigger support, extending up on the opposite side of the main girder from the bottom flange to the cross members. The result has been that complete weighing accuracy is obtained with quite wide extensions of the weighbridge by outrigger-type structure.

The present invention thus extends the usefulness of such transportable scales by enabling their platform to receive still wider loads than previously with greater overhangs past the weighbridge and frame than have heretofore been possible, all without loss in weighing accuracy. A considerable strengthening is provided by a novel type of outrigger support system with matching internal bracing, while at the same time there is no change in the convenience of the device, no necessity for further disassembly of the scales for transport, and no increase in the difficulties of setting up a scale at its new location. A couple of men with a minimum of equipment can still set up the scale quickly and easily.

A different particular problem occurs when succeeding overhanging deck portions meet at loci in between the supporting outriggers. To leave the ends unsupported is to court disastrous results, for when trucks pass over the decks, these unsupported ends flex, bend, or break and soon are bent or broken to where they are no longer useful. The present invention solves this problem by providing support for these ends near the outer edges of the deck. The new support members are themselves connected to the outer ends of the outriggers in a novel structure with important effects.

The transportable scale of this invention comprises a weighbridge supported on a base frame by a lever system. The weighbridge has a rigid frame including longitudinal side members with upper and lower flanges and including cross members. Outrigger brackets project laterally out from the side members in line with the cross members at a location in between and spaced from these flanges. Outrigger members more than twice as long as the outrigger brackets and each pivotally supported by one outrigger bracket and the upper flange and having an upper surface portion bearing against the upper flange and a lower surface portion bearing on the outrigger bracket, are adapted to be swung out individually to extend to the effective width of the weighbridge frame or to fold individually into a position in which it extends out no further than the outrigger brackets. A pair of platform members is releasably supported on said weighbridge, and there is releasable means for locking each outrigger member to its outrigger bracket when the outrigger member is in its extended position. Of special importance is an outrigger support member extending up angularly at about 45° from the lower flange to the lower surface of the outrigger at a locus well beyond the outrigger bracket, the support member being secured to the outrigger and pivotally mounted on the lower flange. The outrigger members are preferably secured to the platform members, and a third platform member is secured to a central portion of the weighbridge. The weighbridge has lateral members extending across between the longitudinal side members and in line with the outrigger brackets and a 45° rigid support member (angle brace) extending from the lower portion of each side member to the lateral member. Thus the angle braces and outrigger supports balance each other, resolve frame stresses and impart the force to be weighed to the weighbridge vertically, without bending moments that would affect weighing accuracy.

In some forms of the invention, the platform is made in sections succeeding each other longitudinally, some of the sections meeting at ends located in between two successive outrigger members. A support beam member is pivotally attached to one of these two outrigger members near the outer end thereof, being foldable in with and against that outrigger member, and bridges to, is supported by and secured to the other outrigger member near its outer end, when the outriggers are in their extended position. The support member has a pad for support of the ends of the sections.

At each end of the weighbridge there may be a removable cross-beam extending, when installed and secured to the weighbridge, across the weighbridge and therebeyond to substantially the same amount as the extended outriggers, for support of the platforms. Each such removable cross-beam has welded to it a short central platform section separate from the pair of platform members and lying between them when the scale is set up for weighing, there being a permanent central platform section welded to the weighbridge in between the two removable central platform sections.

Other objects and advantages of the invention will appear from the following description of a preferred embodiment.

Figure 1:
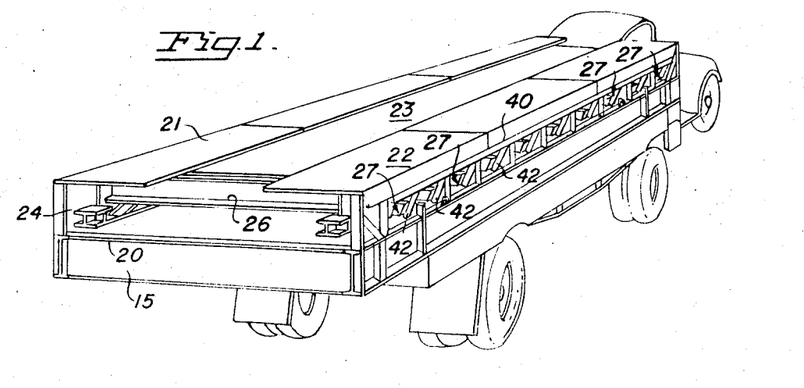
FIG. 1 is a view in perspective of a transportable scale embodying the principles of the present invention mounted upon a large transport truck with a steel plate scale platform shown in its narrow-width or transporting position and with the end beam removed.
Figure 2:
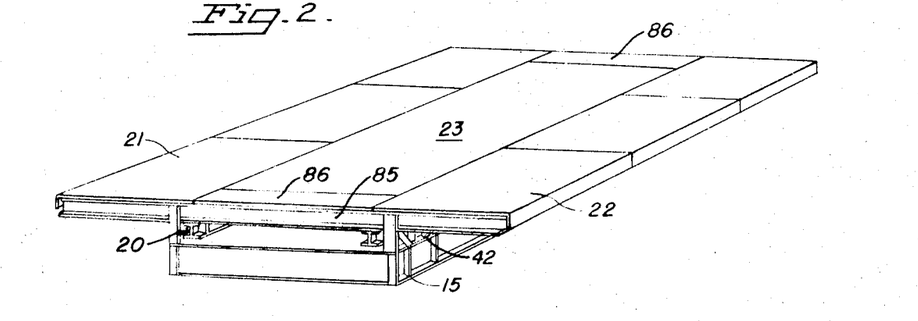
FIG. 2 is a view in perspective of the same scale substantially mounted in its use position but without the foundations, etc. being shown. The end beams have been installed, and the steel deck members have been moved apart from each other to expose a solid deck in the center while extending the runway width thereof a considerable amount. The overhangs of the deck members are supported by the new outrigger structure of this invention.
Figure 3:
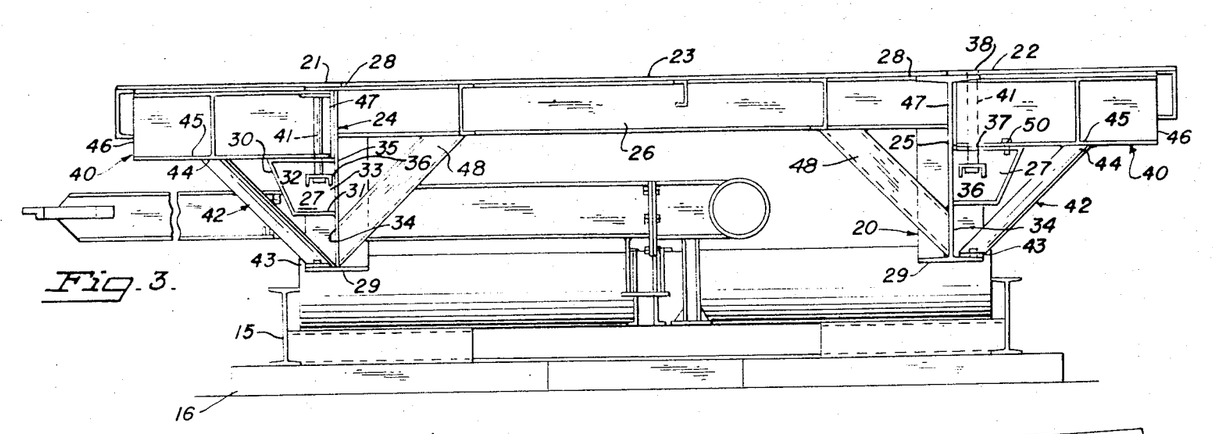
FIG. 3 is a view in elevation and partly in section of a portion of the scale of FIGS. 1 and 2, taken along the line 3—3 in FIG. 4, showing the position occupied by the steel platforms and the outrigger bracket at the time when the scale platforms are moved to their outer or weighing position. Some parts are broken to conserve space.
Figure 4:
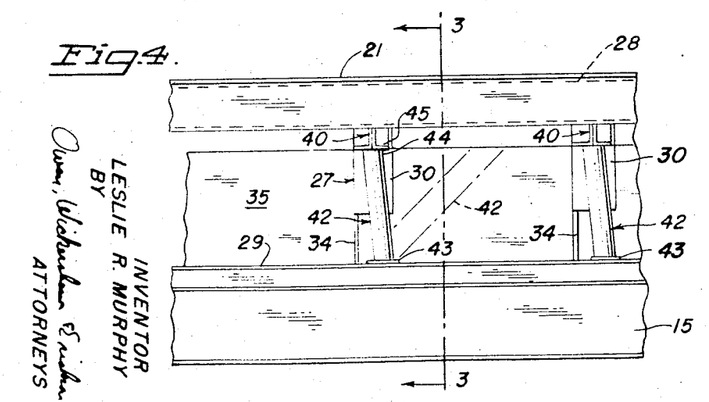
FIG. 4 is a fragmentary view in side elevation showing a couple of the improved outrigger units in their outer position and indicating in broken lines the position occupied by one of them when it is folded against the scale frame for transportation.
Figure 5:
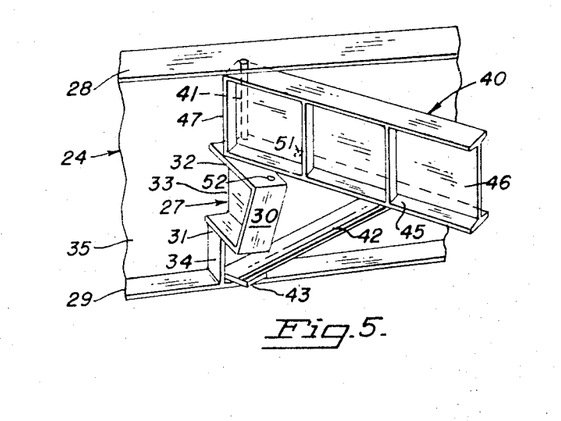
FIG. 5 is a fragmentary view in perspective showing an outrigger unit of this invention in a position midway between its inner or transporting position and its outer or weighing position.

While the scale is transportable, as shown in FIG. 1, it is capable of heavy-duty weighing and when set up as shown in FIGS. 2 and 3, its base 15 is preferably supported on a suitable footing 16. By a suitable lever suspension system of the type well known in the art and only rudimentarily indicated in the drawings, the base 15 supports the weighbridge 20 on which is secured, as by welding, a solid deck portion 23 and on which rest a pair of movable steel runways or platform members 21 and 22. Instead of steel, timber decks may instead be used with no basic change in the structure of the scale unit itself except for the deck and with the same use.

The purpose of the deck or platform members 21 or 22, whether of steel or of wood, is to provide a surface on which vehicles can be driven when they are to be weighed and to transmit the load evenly to the weighbridge 20. The vehicles may be very large earth movers. The weighbridge 20, when depressed by the load, transmits the force through its lever system so as to actuate a suitable lever indicating device which is well known and is not shown in the drawings. There the weigh-beams, dial units, or other indicating devices may be provided.

The present invention is concerned with the connection and cooperation between the weighbridge 20 and the platform members 21 and 22. The weightbridge 20 preferably incorporates two very strong heavy I-beams 24 and 25 which are disposed longitudinally of the scale parallel to each other. These I-beams 24 and 25 are connected together at various points by suitable laterally extending structural members 26. In the present invention short I-beam extension members or outrigger brackets 27 are welded at intervals with the outer side of the I-beams 24 and 25 approximately midway between the top and bottom members 28 and 29 of the I-beam. These outrigger brackets 27 preferably comprise short I-beam cut off at an angle greater than 60° so as to be more nearly vertical and closed with an end plate 30 to strengthen them. Thus they have a lower member 31, an upper member 32, a web 33, and the end plate 30, which extends at the cutoff angle, preferably about 60° or more. To further increase the support strength of the outrigger bracket 27, a vertical plate 34 is welded to one side of the base 31 thereof and extends to the base 29 of the I-beam 24 or 25 and is also welded to the face of the web 35 of the main I-beam 24 or 25. In addition, an inverted channel 36 is preferably welded to one side of the web 35, and above that is an opening 37 in the top plate 32 and aligned therewith, an opening 38 in the top flange 28 of the I-beam 24.

An outrigger support member 40 is pivotally mounted to the upper plate 32 of the outrigger bracket 27. This member 40 preferably comprises another I-beam of about the same height and dimensions as the outrigger bracket 27 but much longer, preferably three or four times as long as the top plate 32. The pivot 41 is located as close to the I-beam web 35 as it can be and still enable swinging, and it preferably comprises a loose pin resting on the inverted channel 36 and extending through the openings 37, the top plate 32 and the flange 28 and also passing through openings 39 in the flanges of the outrigger member 40. Thus the outrigger member 40 can be swung around the pivot 41 substantially in the manner described in my earlier Patent 3,097,713 and is thus substantially in line with one of the laterally extending members 26.

However, in the present invention it is possible to employ a much longer outrigger because I additionally support the outrigger 40 by an inclined column 42 which extends at about an angle of 45° from a shoe 43, and the shoe 43 is pivoted to the bottom plate 29 of the I-beam 24 or 25, preferably fairly close to the vertical support 34 for the outrigger bracket 27. The shoe 43 may simply be a flat piece of steel properly pivoted to the bottom plate 29 of the I-beam 24 or 25, while the inclined support 42 is preferably a hollow tube or pipe. For example, with a two-foot outrigger, three-inch pipe may be used. The upper end 44 of the support 42 is welded to the bottom plate 45 of the outrigger 40 at a distance closer to the outer end 46 than to its inner end 47, preferably about two-thirds of the way out.

The inclined pipe or column 42 transmits force in to the base 29 of the I-beam 24 or 25 and therefore adds great rigidity to the outer portion of the outrigger 40. At the same time the outrigger bracket 27 gives support to the inner portion of the outrigger 40 and is very firmly supported both by its own box and I-beam structure and by the vertical support member 34. Thus, the forces at the outer end of the outrigger 40 tend to be resolved along the vertical column 42 instead of causing the outrigger 40 to sag at the outer end 46.

To preserve the accuracy of the scale, each outrigger 40 and 45°-support 42 is complemented by a 45°-channel iron knee brace 48 welded to the inside of the I-beams 24 and 25 and to the inside bottom flange 20 of the I-beams 24 and 25 and to the bottom of the lateral structure member 26 which is in line with that outrigger 40. The efficacy of this important feature has been explained at length in the introduction to this specification.

In transporting position the outrigger 40 is folded in underneath the I-beam top plate 28 and sticks out a very short distance from it, not as far as the outrigger bracket 27. The pipe 42 is simultaneously folded in, for it moves with the outrigger, and it does not stick out beyond the I-beam plate 28. When the scale is set up, the outrigger 40 is swung out, and the structure is fixed in its new position by a pin 50 or other suitable means which passes through a perforation 51 in the bottom plate 45 of the outrigger 40, and a similar perforation 52 in the top plate 32 of the outrigger support bracket 27. Then the decks are moved into their positions. When the scale is to be transported, the pin 50 is lifted out, the outrigger 40 is swung in. When the decks 21 and 22 are moved into their transporting position, they may be tied to the rest of the scale.

Figure 6:
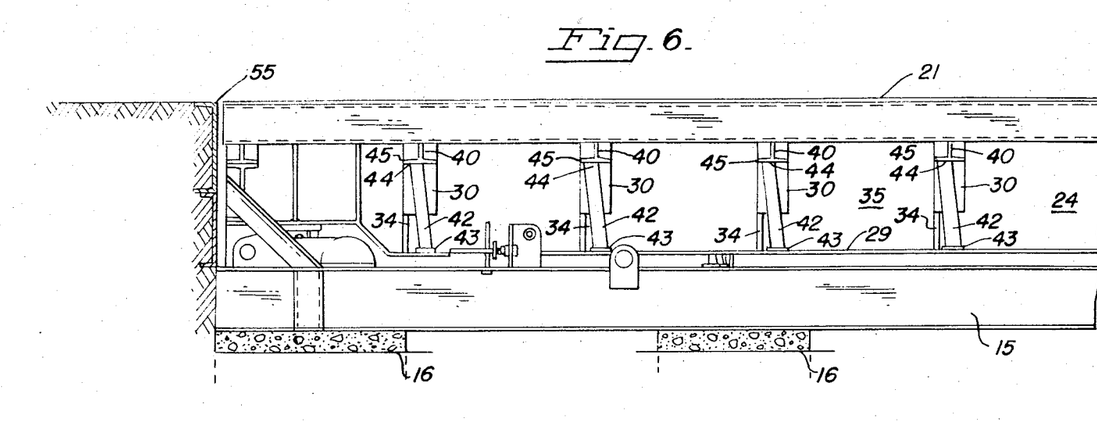
FIG. 6 is a fragmentary view in side elevation and partly in section of a modified form of the invention incorporating a steel bulkhead at its ends.
Figure 7:
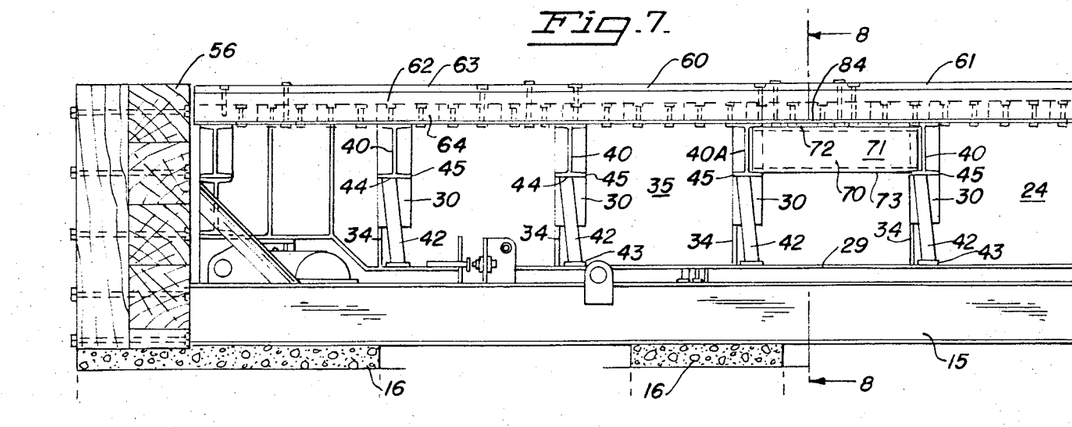
FIG. 7 is a view similar to FIG. 6 of a modified form of scale incorporating a wooden bulkhead and a wooden deck made in sections and showing a special system for supporting the ends of two successive sections meeting in between successive outriggers.
Figure 8:
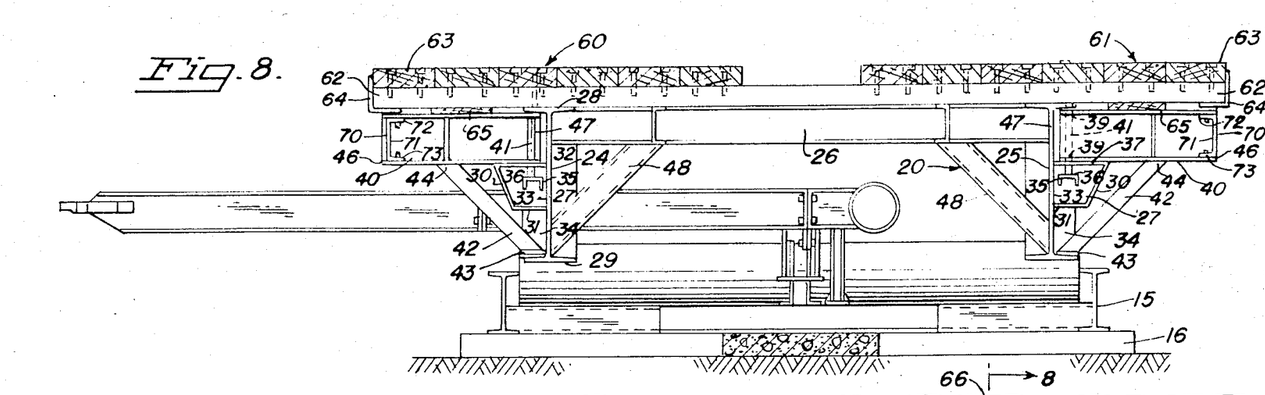
FIG. 8 is a view in section taken along the line 8—8 in FIGS. 7 and 9.
Figure 9:
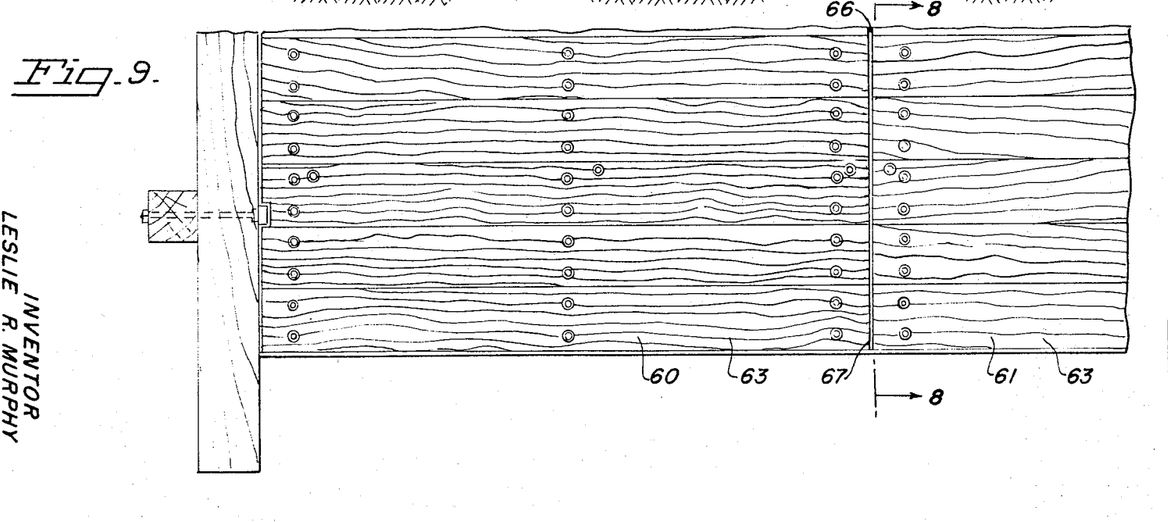
FIG. 9 is a fragmentary enlarged top plan view of a portion of the device of FIGS. 7 and 8.
Figure 10:
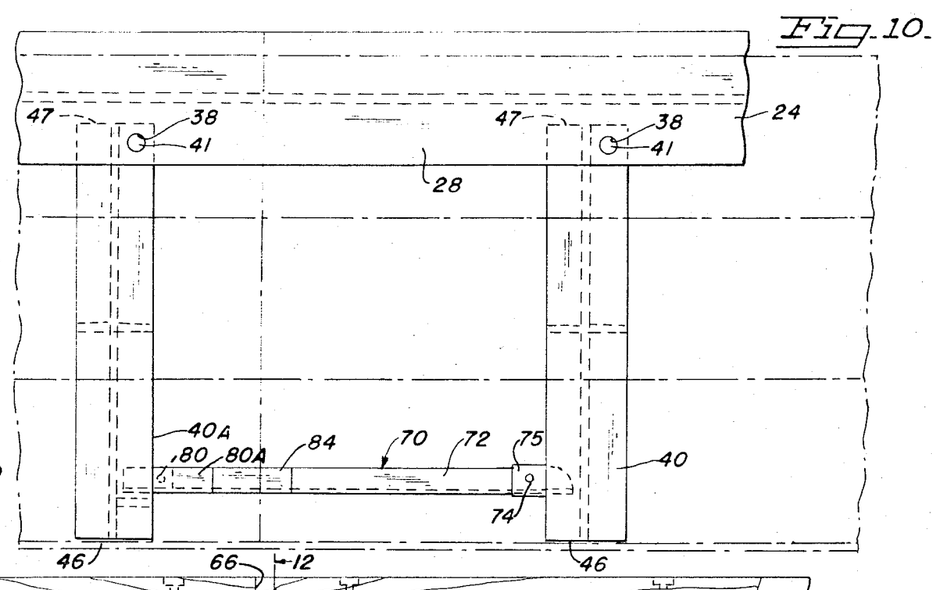
FIG. 10 is a fragmentary top plan view corresponding to FIG. 9 and showing the support structure beneath the deck.
Figure 11:
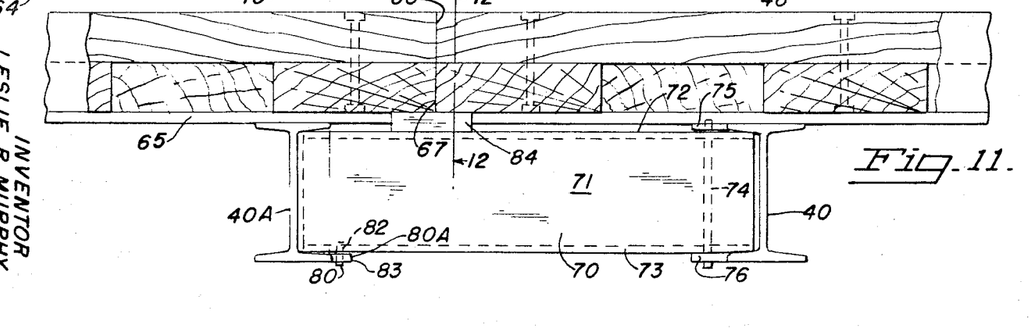
FIG. 11 is a fragmentary view in side elevation looking at the side of the portion shown in FIG. 10 with the deck in place.

In these scales, it is not necessary to excavate a pit for installation of the footing 16. Instead, I provide a bulkhead 55 as shown in FIG. 6. The bulkhead 55 is connected to the base 15 and shields the weighbridge 20 from the dirt. The bulkhead may be of metal, as shown in FIG. 6, and it should be high enough to extend up to the platform level. FIG. 7 shows a wooden bulkhead 56 which is otherwise substantially the same.

FIG. 7 also shows, as do FIGS. 8–12, a structure utilizing wooden platform sections 60, 61, etc. Preferably each such platform 60, 61 has two layers of timbers 62, 63, a lower one 62 running widthwise of the scale while the upper one 63 extends lengthwise. To contain the platform sections 60, 61, I prefer to employ an angle iron 64 along the outer lower edge. To provide good contact with the outriggers 40, I prefer to provide lower stringers 65.

Figure 13:
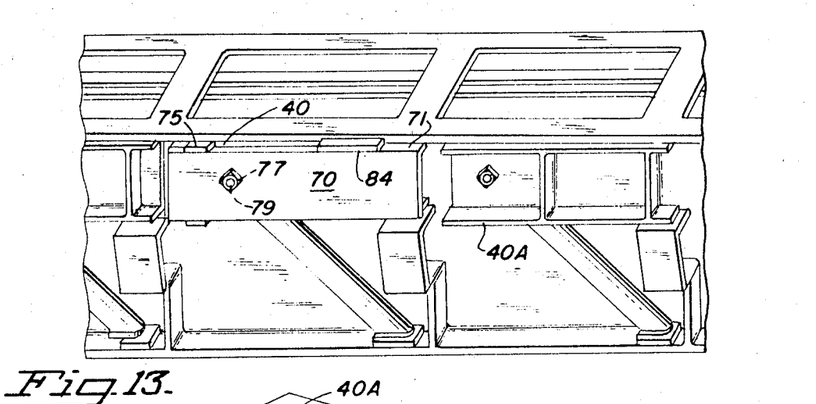
FIG. 13 is a fragmentary view in perspective of the deck portion of FIGS. 10–12 with the extension members folded into transporting position.
Figure 14:
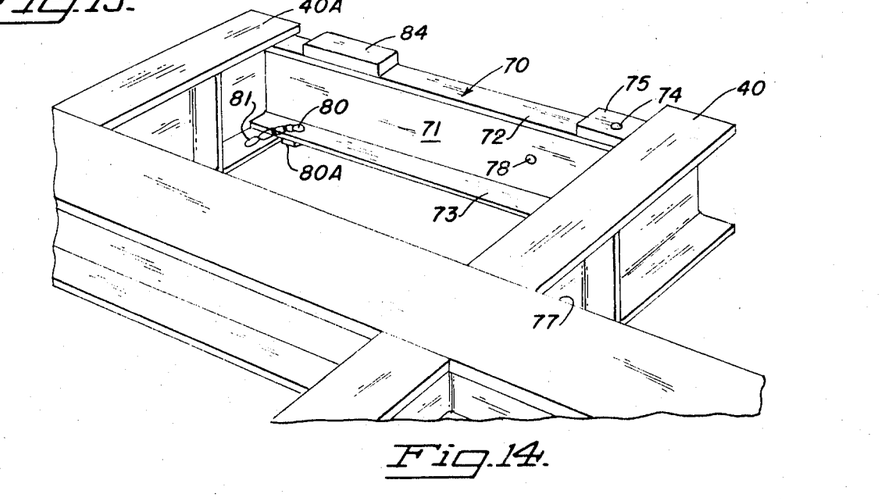
FIG. 14 is a fragmentary enlarged view in perspective of the extension members in their extended position.

As mentioned earlier, sometimes the spacing necessary between successive outriggers 40 does not correspond to the length of the platform sections, and two successive platforms 60 and 61 may meet on some occasions with their edges 66 and 67 in between two successive outriggers 40 and 40A, as shown in FIGS. 7–14. This would normally endanger the life and effectiveness of the platform members 60 and 61. However, I have solved the problems involved by employing a special support member 70 preferably comprising a short channel with a web 71, an upper flange 72, and a lower flange 73. Near one end, the member 70 is pivoted to the outer end of the outrigger 40 by a pivot member 74, which may be supported by extensions 75 and 76 on the upper and lower flanges of the outrigger 40. When the outrigger 40 is folded into its collapsed position, the support member can also be folded, as shown in FIG. 13. A slot-like elongated opening 77 in the outrigger 40 and a similar opening 78 enables them to be secured by a bolt 79 in the collapsed position. When the outriggers are extended, the support member 70 bridges between the outriggers 40 and 40A resting on and supported by the lower flange of the outrigger 40A and secured to an extension 80A thereof by a pin 80 normally loose and held by a chain 81 to the outrigger 40A and passing through suitable aligned openings 82 and 83 when locking the outrigger 40A and support member 70 together. A pad 84 on top of the support member 70 supports the angle irons 64 and edges 66 and 67 of the deck sections 60 and 61 and prevents damage that would follow from lack of support.

As shown in FIGS. 1 and 2, there may be a removable beam 85 at each end of the scale extending, when installed, the full width of the scale with its outriggers extended. This beam 105 rests on two pads on the longitudinal beams 24 and 25. A short central platform section 86 may also be welded to the beam 85. Normally, the beam 85 is in place except during transport of the scale.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A transportable scale with an extendible weighbridge capable of very accurate weighing, comprising
 a base frame,
 a weighbridge supported on said base frame by a lever system, said weighbridge having a rigid frame, including longitudinal side members joined by lateral members at right angles thereto, said side members having upper and lower flanges and with outrigger brackets each generally in line with a said lateral member projecting laterally out from said side members at a location in between and spaced from said flanges,
 outrigger members more than twice as long as said outrigger brackets and each pivotally supported by one said outrigger bracket and said upper flange and having an upper surface portion bearing against said upper flange and a lower surface portion bearing on said outrigger bracket and adapted to individually be swung out generally in line with said lateral members to extend the effective width of said weighbridge frame or to fold individually into a position in which it extends out no further than said outrigger brackets, a pair of platform members releasably supported on said weighbridge, releasable means for locking each of said outrigger members to its said outrigger bracket when said outrigger members are in their extended position, an outrigger support member extending up angularly at about 45° from a said lower flange to the lower surface of said outrigger at a locus well beyond said outrigger bracket, said support member being secured to said outrigger and pivotally mounted on said lower flange generally in line with a said lateral member, and a 45° rigid support member opposite each said outrigger support member and extending from the lower portion of each said side member to a said lateral member.

2. The scale of claim 1 wherein said outrigger members are secured to said platform members and wherein there is a third said platform member secured to a central portion of said weighbridge.

3. The scale of claim 1 wherein each said platform member is made in sections succeeding each other longitudinally, some of said sections meeting at ends thereof located in between two successive outrigger members and wherein a support beam member is pivotally attached to one of said two outrigger members near the outer end thereof, being foldable in with and against that said outrigger member, and bridges to the other of said two outrigger members, being supported by and secured to that said other outrigger member near its outer end when the outriggers are in their extended position, said support member having a pad for support of said ends of said sections.

4. The scale of claim 1 wherein at each end of said weighbridge there is a removable cross-beam extending, when installed and secured to said weighbridge, across said weighbridge and therebeyond to substantially the same amount as the extended outriggers, for support of said platforms.

5. The scale of claim 4 wherein each said removable cross-beam has welded to it a short central platform section separate from said pair of platform members and lying between them when the scale is set up for weighing, there being a permanent central platform section welded to said weighbridge in between the two removable central platform sections.

6. The scale of claim 1 wherein there are bulkheads secured to said main frame at each end thereof and extending up to substantially the top of said weighbridge and the platform members thereon, to serve as a retaining wall for said scale when said scale is installed.

7. A highway-transportable scale for off-the-highway weighing comprising a base frame, a weighbridge supported on said base frame by a lever system, said weighbridge having a rigid frame including a pair of longitudinal side I-beams each with a top flange, a bottom flange, and a web, and a plurality of rigid lateral structural members perpendicular to said I-beams and joining them together, a plurality of outrigger brackets each welded to a said web about midway between said top and bottom flanges and projecting laterally out therefrom generally in line with a said lateral structural member and each comprising a smaller I-beam with a top plate, bottom plate, a web, and an end plate extending up and out at about 60° to horizontal, a plurality of support plates each welded to said web of a said side I-beam and to said bottom flange thereof and to the bottom plate of a said outrigger bracket, a plurality of outrigger members each pivotally attached to a said top flange and a said top plate and having upper surface portions in engagement with a lower surface of said top flange and a lower surface portion in engagement with the upper surface of said top plate, said outrigger members being several times as long as said outrigger brackets and being adapted to be swung out individually generally in line with a said lateral member to extend the effective width of said weighbridge frame and also to fold individually into a collapsed position parallel to said side I-beams, each said outrigger member itself comprising an I-beam, a pair of platforms releasably supported on said weighbridge, a plurality of outrigger support members, each having a shoe plate pivotally secured to a said lower flange and each welded to the lower surface of a said outrigger member and each extending up and out at an angle of about 45° to said bottom flange and foldable against the web of a said side I-beam with its said outrigger member, to resolve the downward thrust on the outer end of said outrigger member against said bottom flange and thereby prevent sagging of said outrigger member under large loads, and a 45° channel-iron knee brace welded to the inside face of the web of said side I-beams and to the inside portion of said bottom flange thereof and to the bottom of said lateral structural members, for further stiffening said weighbridge to assure accuracy of weighing.

8. The scale of claim 7 wherein each said platform member is made in sections succeeding each other longitudinally, some of said sections meeting at ends thereof located in between two successive outrigger members and wherein a support beam is pivotally secured to the outer end of a first of said two outrigger members so that it can be folded in against it when said first outrigger member is in its collapsed position and, when said first outrigger member is in its extended position, said support beam bridges between it and is secured to and supported by the outer end second of said two outrigger members, said support beam having rest means on its upper surface for supporting said ends of said sections.

9. The scale of claim 8 wherein said platform sections comprise laminated planks having an angle iron along their outer edge, said rest means comprising a pad engaging said angle iron, said sections also having at least one bottom plank inwardly of said angle iron resting on said outrigger members.

10. The scale of claim 7 wherein each said outrigger bracket has an inverted channel welded thereto and projecting from one side of its said web, its top plate and said top flange of said I-beam having aligned openings above said inverted channel, said outrigger members each having aligned openings mated therewith, and a pivot pin extending through said four openings and resting on said inverted channel and comprising the pivotal attachments of said outrigger members to said outrigger brackets and said top flange.

11. The scale of claim 7 wherein said base frame is provided with vertical bulkheads at each end to serve as retaining walls at each end of said scale, said bulkheads extending up substantially to platform level.

12. In a transportable scale having a base frame, a weighbridge supported on said base frame by a lever system and provided with a rigid frame, including longitudinal side members with upper and lower flanges, cross members joining said side members, and a pair of platforms releasably supported on said weighbridge, the combination therewith of:

a plurality of outrigger brackets projecting laterally out from said side members, each in line with a said cross member, at locations vertically in between and spaced from said flanges;

an outrigger member for each said outrigger bracket more than twice as long as said outrigger bracket, pivotally supported by said outrigger bracket and said upper flange and having an upper surface portion bearing against said upper flange and a lower surface portion bearing on said outrigger bracket and adapted to individually be swung out generally in line with a said cross member to extend the effective width of said weighbridge frame or to fold individually into a position in which it extends out no further than said outrigger brackets;

releasable means for locking each of said outrigger members to its said outrigger bracket when said outrigger members are in their extended position;

an outrigger support member for each said outrigger member extending up angularly at about 45° and in line with a said cross member from a said lower flange to the lower surface of said outrigger at a locus well beyond said outrigger bracket, said support member being secured to said outrigger member and pivotally mounted on said lower flange, and a 45° rigid support member opposite each said outrigger support member and extending from the lower portion of each said side member to a said cross member.

13. The combination of claim 12 having a short beam support member pivotally secured to the outer end of at least one said outrigger member and foldable in against it and bridging, when extended out 90° to the extended said outrigger member, to a next adjacent said outrigger member and supported thereby and releasably attached thereto.

14. In a transportable scale having a base frame and a weighbridge supported on said base frame by a lever system, said weighbridge having a rigid frame including longitudinal side I-beams each with a top flange, a bottom flange, and a web, a series of cross members joining said I-beams, and a pair of patforms releasably supported on said weighbridge, the combination therewith of:

a plurality of outrigger brackets each welded to a said web about midway between said top and bottom flanges and projecting laterally out therefrom, each generally in line with a said cross member and each comprising a smaller I-beam with a top plate, bottom plate, a web, and an end plate extending up and out at about 60° to horizontal, a corresponding plurality of support plates each welded to the web and bottom flange of one said side I-beam and to the bottom plate of one said outrigger bracket, a corresponding plurality of outrigger members, each comprising an I-beam with top and bottom members and each pivotally attached to a said top flange and a said top plate and having upper surface portions of its top member in engagement with a lower surface of said top flange and lower surface portions of its bottom member in engagement with the upper surface of said top plate, said outrigger members being several times as long as said outrigger brackets and being adapted to be swung out individually generally in line with a said cross member to extend the effective width of said weighbridge frame and also to fold individually into a collapsed position parallel to said side I-beams, a corresponding plurality of outrigger support members, each having a shoe plate pivotally secured to said lower flange and each having an upper end welded to the lower surface of said lower member of a said outrigger member and each extending up and out at an angle of about 45° to said bottom flange and foldable against the web of a said side I-beam with its said outrigger member, said support members serving to resolve the downward thrust on the outer ends of said outrigger members against said bottom flanges and thereby to prevent sagging of said outrigger members under large loads, and a 45° channel-iron knee brace welded to the inside face of the web of said side I-beams and to the inside portion of said bottom flange thereof and to the bottom of said cross members, for further stiffening said weighbridge and to ssure vertical application thereto of loads resting on said platforms at locations supported by said outrigger members.

15. The scale of claim 14 wherein there is a center deck member on top of the central portion of said weightbridge and secured thereto, with the side edges abutting the side edges of said platforms when the scale is in its extended position, said platforms being bolted to said outrigger members, said platforms also being bolted to said central platform when said scale is in transport position.

References Cited

UNITED STATES PATENTS

| | | | |
|---|---|---|---|
| 1,228,583 | 6/1917 | Mueller | 248—289 |
| 2,869,855 | 1/1959 | Murphy | 177—136 XR |
| 2,962,275 | 11/1960 | Thurston | 177—134 XR |
| 3,097,713 | 7/1963 | Murphy | 177—126 |

ROBERT S. WARD, JR., *Primary Examiner.*

U.S. Cl. X.R.

177—134, 136; 248—289